United States Patent [19]

Holmberg

[11] Patent Number: 5,469,477

[45] Date of Patent: Nov. 21, 1995

[54] METHOD AND ARRANGEMENT FOR MINIMIZING SKEW

[75] Inventor: Per A. Holmberg, Stockholm, Sweden

[73] Assignee: Telefonaktiebolaget LM Ericsson, Stockholm, Sweden

[21] Appl. No.: 170,879

[22] Filed: Dec. 21, 1993

[30] Foreign Application Priority Data

Dec. 22, 1992 [SE] Sweden ............................ 9203882

[51] Int. Cl.⁶ ............................................... H04L 7/00
[52] U.S. Cl. ........................ 375/356; 375/354; 375/371; 371/1; 327/415; 327/292
[58] Field of Search .................................. 375/106, 107, 375/118, 354, 356, 371; 328/103–106; 307/269, 480, 592, 595; 331/60, 74; 330/150, 370; 371/1

[56] References Cited

U.S. PATENT DOCUMENTS

| | | | |
|---|---|---|---|
| 4,782,253 | 11/1988 | Shoji | 307/602 |
| 4,833,695 | 5/1989 | Greub | 375/107 X |
| 4,860,322 | 8/1989 | Lloyd | 375/107 |
| 5,163,068 | 11/1992 | El-Amawy | 375/107 |

FOREIGN PATENT DOCUMENTS 362691  4/1990  European Pat. Off. .

*Primary Examiner*—Stephen Chin
*Assistant Examiner*—Amanda T. Le
*Attorney, Agent, or Firm*—Burns, Doane, Swecker & Mathis

[57] ABSTRACT

A method and an arrangement minimizes skew in digital synchronous systems. The arrangement includes N number of driver circuits, each of which has a P number of buffer units, of which each has an input and an output. Each driver circuit has a delay of $\delta_1, \delta_2, \delta_3, \delta_4 \ldots \delta_N$. Of these buffer units, N–1 buffer units are reserved while the inputs of the remaining buffer units P-(N–1) are connected mutually in parallel. The reserved buffer units are used as follows. A signal deriving from a signal source is applied to an input of a first buffer unit in each of the N-number of driver circuits, where the signal is subjected to a delay. The one-time delayed signal from a driver circuit is then delayed once, and only once, in the reserved buffer units of each of the remaining driver circuits. This procedure is repeated for each of the once-delayed signals on the outputs of the first buffer unit in each of the remaining N–1 driver circuits. Output signals which are mutually delayed by a time delay of $\delta_1+\delta_2+\delta_3+\delta_4\ldots+\delta_N$ appear on the outputs of the buffer units in each of the driver circuits, the inputs of these buffer units being connected in parallel.

3 Claims, 2 Drawing Sheets

METHOD AND ARRANGEMENT FOR MINIMIZING SKEW

TECHNICAL FIELD

The present invention relates to a method and to an arrangement for minimizing skew in synchronous digital systems.

More specifically, the invention relates to a method and to an arrangement which will guarantee a smallest time difference between signals that are delivered to a first number of driver circuits each of which includes a number of buffer units each having an input and an output, and each driver circuit having a respective time delay, said signals being generated in response to a signal, generated by a signal source, which is applied to an input of a buffer unit on each of the driver circuits, wherein the signal from said signal source is passed through the driver circuits in a manner such that the output signals have, in relation to the signal from said signal source, a total delay which is the sum of the delay in each driver circuit.

BACKGROUND ART

In a synchronous digital system, a master or system clock is distributed to those circuits that perform synchronous functions. In order to mutually coordinate these synchronous functions, it is essential that each functional element is connected to a clock line in which the variation of the flank of a clock pulse, within narrow limits, will occur simultaneously with the occurrence of a corresponding flank on remaining distributed clock pulses that occur in other functional elements. The time difference between the flank of a clock pulse on a clock line and a corresponding flank of a corresponding clock pulse on another clock line, where both of the clock pulses are derived from the same master or system clock, is called skew and is measured in nanoseconds.

Since a single master clock is unable to drive a large number of driver circuits in a synchronous system, groups of local clock lines are produced from the main clock pulse, by utilizing driver circuits which each consist of a plurality of buffer units. Skew is caused by the difference in the response time of different driver circuits.

A method and an arrangement of the kind defined in the introduction are described in European Patent Application No. 0,362,691. This known arrangement includes two driver circuits from which a total of six clock signals is obtained. These six clock signals have a delay which amounts to the total or combined delay of each of the two driver circuits. When additional clock signals are required, it is necessary to use further driver circuits. The European patent application, however, fails to disclose how this problem shall be solved.

A conceivable expansion of the principle described in the European patent application would be to duplicate the known arrangement, i.e., to use two arrangements of the kind illustrated, and connect each of the arrangements to the clock generator. This solution, however, would mean that the clock signals from the two arrangements would mutually present a delay which can vary within much wider limits than the delay occurring between the clock signals in each arrangement.

Another solution to the problem would be to manufacture driver circuits in which the number of buffer units is much greater than the four buffer units shown. Present-day technology enables a driver circuit to be produced which has up to thirty-two buffer units, wherein the skew of the driver circuit is retained within one or a few nanoseconds.

These known solutions cannot be applied, at least with a reasonable number of clock circuits and a reasonable number of driver circuits, when hundreds of IC-circuits shall be driven synchronously. Several parallel-connected driver circuits are required in order to drive the high capacitive load presented by so many IC-circuits. Circuit manufacturers offer solutions with matched circuits or special clock drivers and are able to guarantee a smallest skew between different circuits, although this solution is not sufficiently effective when hundreds of IC-circuits are to be driven synchronously.

SUMMARY OF THE DISCLOSURE

The present invention is a development of the principle described in the aforesaid European Patent Application and is achieved by reserving a number of buffer units on each of the driver circuits and utilizing the reserved buffer units to delay the signal repeatedly. More specifically, the signal that has been delayed once on the output of the buffer unit in a driver circuit is passed through each of the remaining driver circuits. This procedure is repeated for each of the once-delayed signals in the remaining driver circuits. All output signals from the driver circuits will mutually present a skew which is equal to the sum of the delay in each driver circuit.

BRIEF DESCRIPTION OF THE DRAWING

The invention will now be described with reference to the accompanying drawing, in which.

DETAILED DESCRIPTION OF THE DISCLOSURE

Figure 1:
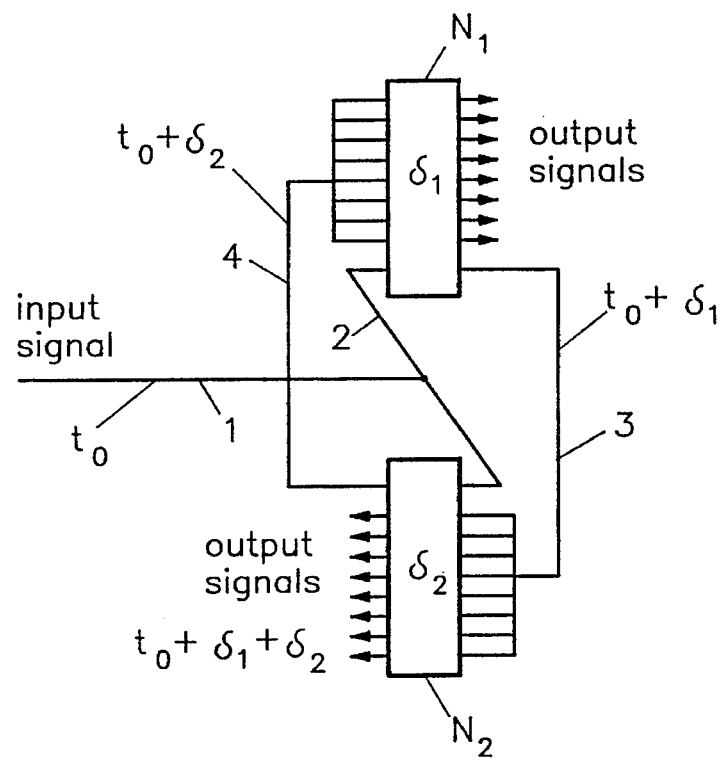
FIG. 1 illustrates a known skew minimizing circuit.

The known circuit illustrated in FIG. 1 includes two driver circuits $N_1$, $N_2$, each of which has a total of nine buffer units (not shown). Each buffer unit has an input and an output. These inputs and outputs are shown schematically in the Figures, by means of lines. The delay in the driver circuit $N_1$ is designated $\delta_1$ and the delay in the driver circuit $N_2$ is designated $\delta_2$. The manufacturer guarantees that the delay in each driver circuit will amount to a specified time at maximum. A typical maximum delay time for a driver circuit of type 74ABT827 having ten buffer units is 4.8 nanoseconds. A clock pulse (not shown) arrives on a line 1 and is distributed via a line 2 to the input of each buffer unit in each of the two driver circuits $N_1$ and $N_2$. The clock signal appears on the output of the buffer unit used in the driver circuit $N_1$ at a time delay $\delta_1$ relative to the time $t_0$, where $t_0$ is the time at which the clock pulse arrived on the input. The delayed clock pulse is led to the parallel-coupled inputs of the buffer units of the driver circuit $N_2$ via a line 3. The clock signal will thus appear on corresponding outputs delayed by the time delay $\delta_1+\delta_2$. The clock pulse on line 1 also passes to the input of a buffer unit in the driver circuit $N_2$, via the line 2. The clock pulse appears on the output of this buffer unit delayed by time $\delta_2$, and is led to the parallel-coupled inputs of the remaining eight buffer units in the driver circuit $N_1$, via line 4. The clock pulse signals delayed on the eight lines are now subjected to a last delay in the driver circuit $N_1$ prior to appearing on the outputs of the buffer units of the driver circuit $N_1$, where the clock signals have the total delay $\delta_1+\delta_2$, i.e., the same delay as the output signals from the driver circuit $N_2$. This method guarantees a skew, or a mutual time delay, of $\delta_1+\delta_2$ between all of the clock signals leaving the two driver circuits $N_1$ and $N_2$.

Figure 2:
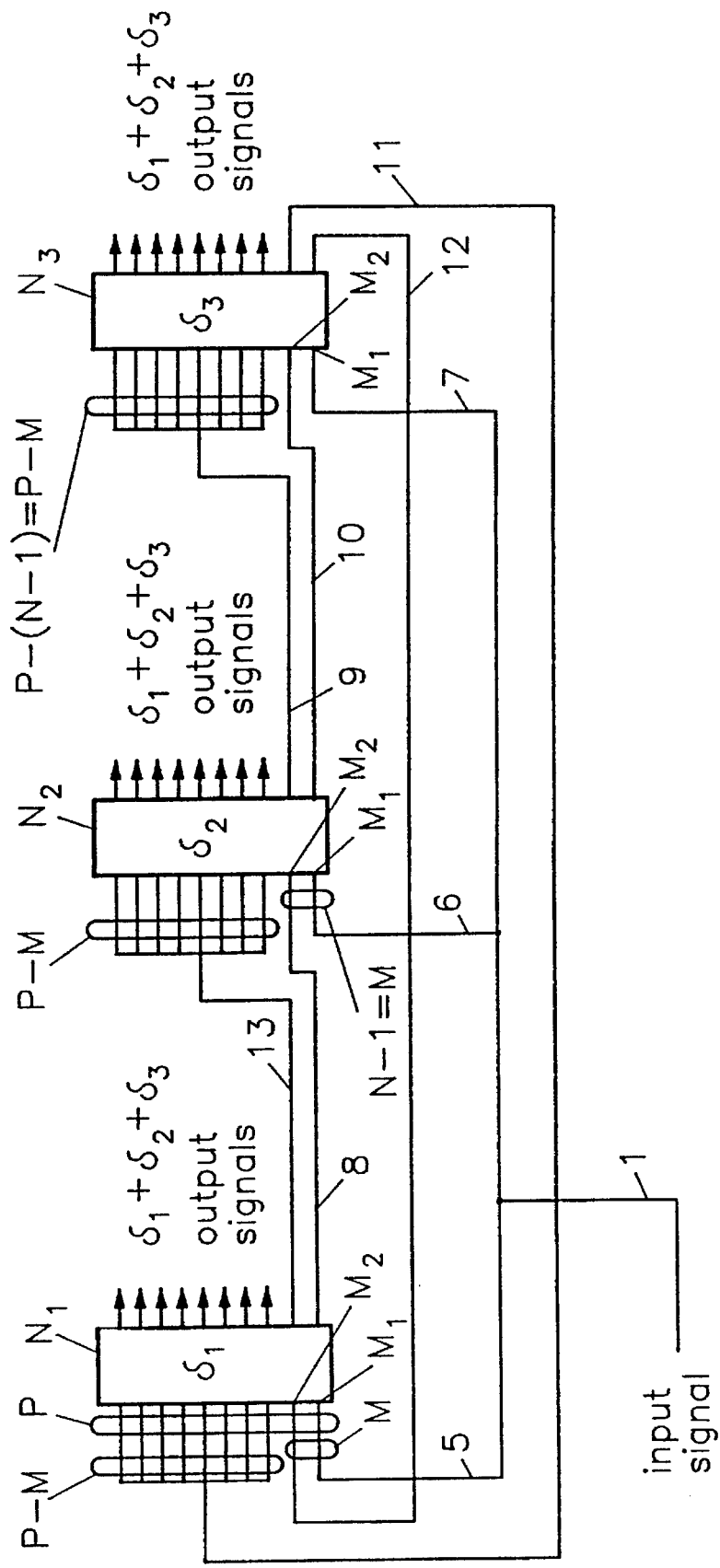
FIG. 2 illustrates a first inventive circuit.

FIG. 2 illustrates an inventive arrangement, in which three driver circuits $N_1$, $N_2$ and $N_3$ are used. In relation to the circuit illustrated in FIG. 1, there is obtained a larger number of synchronized clock signals which mutually have a time delay that amounts to the sum of each driver circuit delay, in this case $\delta_1+\delta_2+\delta_3$, where $\delta_1$ is the delay in the driver circuit $N_1$, $\delta_2$ is the delay in the driver circuit $N_2$ and $\delta_3$ is the delay in the driver circuit $N_3$. Each driver circuit $N_1$–$N_3$ includes P buffer units (not shown), each having an input and an output. Of these buffer units, M number of buffer units are reserved for processing the clock signal on the line 1 in a manner described in more detail herebelow. More specifically, N–1 number of buffer units are reserved, where N is an integer which denotes the number of driver circuits. Thus, M=N–1. In the FIG. 2 embodiment, N=3 and thus M=2. The inputs of the remaining P-M reserved buffer units in each of the driver circuits $N_1$–$N_3$ are mutually connected in parallel in the manner illustrated. The inputs of the M reserved buffer units are referenced $M_1$, $M_2$ in each of the driver circuits. The driver circuits and the reserved buffer units are numbered in sequence in the following, so as to facilitate presentation. A numbered sequence, however, is not essential to the invention.

The clock signal on the line 1 is now distributed to each driver circuit $N_1$–$N_3$ via lines 5, 6 and 7, so that the signal will lie on the input of the buffer units $M_1$ in each of the driver circuits.

The clock signal delayed by $\delta_1$ on the output of the buffer unit M1 in the first driver circuit $N_1$ is passed on a line 8 to the input of the second buffer unit $M_2$ in the second driver circuit $N_2$, where it is delayed by $\delta_2$ before appearing on the output of the buffer unit $M_2$. A line 9 connects the output of the buffer unit $M_2$ to the parallel-connected inputs of the P-M parallel-connected inputs on the third driver circuit $N_3$. The clock signal delayed by the time delay $\delta_1+\delta_2$ is subjected to a last delay $\delta_3$ in the remaining unreserved P-M buffer units in the driver circuit $N_3$ before appearing on each of the outputs of the remaining P-M buffer units. The arrow heads adjacent the driver circuit $N_3$ represent these output signals, which are mutually delayed by time delay $\delta_1+\delta_2+\delta_3$.

A similar procedure takes place for the clock signal on the line 6. More specifically, a line 10 connects the output of the first buffer unit in the second driver circuit $N_2$ with the input of the second buffer unit in the third driver circuit $N_3$. A clock signal delayed by time delay $\delta_2+\delta_3$ now lies on the output of the second buffer unit in the driver circuit $N_3$. A line 11 connects the output of the second buffer unit in the third driver circuit $N_3$ to the P-M parallel-connected inputs of the buffer units in the first driver circuit $N_1$, in which the $\delta_2+\delta_3$ delayed clock signal is subjected to a last delay $\delta_1$, so that P-M output signals mutually delayed by the time delay $\delta_2+\delta_3+\delta_1$ exist on the remaining P-M buffer units, these P-M output signals being represented by the arrow heads at $N_1$.

The same procedure is repeated for the clock signal on the line 7, which passes to the input of the first buffer unit $M_1$ in the third driver circuit $N_3$. A line 12 connects the output from this first buffer unit to the input of the second buffer unit $M_2$ in the first driver circuit $N_1$. Thus, the clock signal on the output of this second buffer unit has been delayed by $\delta_3+\delta_1$. A line 13 connects the output of the second buffer unit $M_2$ in the first driver circuit $N_1$ to the P-M parallel-connected inputs of the remaining buffer units in the second driver circuit $N_2$. The twice delayed signals are subjected in this second driver circuit to a last delay, so that P-M output signals mutually delayed by $\delta_3+\delta_1+\delta_2$ will lie on remaining P-M outputs of the second driver circuit $N_2$.

It will be evident from the aforegoing that clock signals whose mutual delay, or skew, now amounts to $\delta_1+\delta_2+\delta_3$ lie on the P-M outputs of each of the driver circuits $N_1$, $N_2$ and $N_3$.

In the FIG. 2 illustration, the driver circuits $N_1$, $N_2$ and $N_3$ are arranged in a linear row, one after the other. In an alternative embodiment, however, the driver circuits $N_1$, $N_2$ and $N_3$ may be disposed in a rotational-symmetrical relationship, so that the lines 5, 6, 7 will have mutually equal lengths and so that the lines 8, 9, 10, 11 and 12 will also be essentially of equal lengths. A rotational-symmetrical arrangement of this nature is shown, for instance, in FIG. 3, where the driver circuits are four in number.

Figure 3:
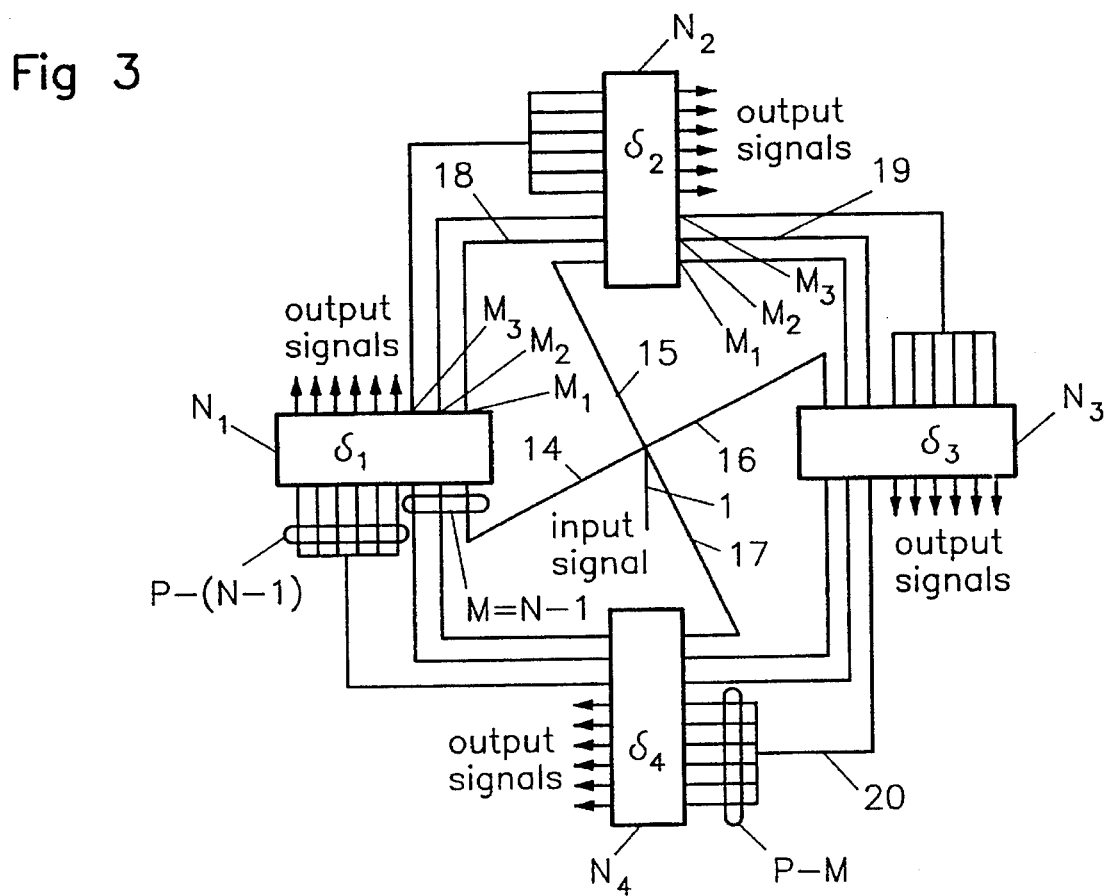
FIG. 3 illustrates a second inventive circuit.

In the case of the FIG. 3 embodiment, the number of driver circuits N=4, and thus the number of reserved buffer units are N–1=M=3. The M reserved buffer units are numbered in the order sequence $M_1$, $M_2$ and $M_3$ in each of the drive units $N_1$, $N_2$, $N_3$ and $N_4$. The clock signal on the line 1 is distributed to the input of the first buffer unit on each of the four driver circuits, by means of lines 14, 15, 16 and 17. The driver circuit $N_1$ has a delay of $\delta_1$, the driver circuit $N_2$ has a delay of $\delta_2$, the driver circuit $N_3$ has a delay of $\delta_3$ and the driver circuit $N_4$ has a delay of $\delta_4$. The output of the first buffer unit $M_1$ in the first driver circuit $N_1$ is connected by a line 18 to the input of the second buffer unit in the second driver circuit $N_2$. The output of the second buffer unit in the second driver circuit $N_2$ is connected by a line 19 to the input of the third buffer unit in the driver circuit $N_3$. The clock signal on the output of the third buffer unit will thus be delayed by a time delay of $\delta_1+\delta_2+\delta_3$. The output of the third buffer unit in the third driver circuit is connected to the parallel-connected inputs of the inputs of the remaining P-M buffer units, where the three times delayed clock signal is subjected to a last delay $\delta_4$ prior to appearing on the outputs of said P-M buffer units, at which the clock signals are mutually delayed by the time delay $\delta_1+\delta_2+\delta_3+\delta_4$.

The output of the first buffer unit in the second driver circuit $N_2$ is connected to the input of the second buffer unit in the third driver unit $N_3$. The output of the second buffer unit in the third driver circuit $N_3$ is connected to the input of the third buffer unit in the fourth driver circuit $N_4$, and the output from the last-mentioned buffer unit is connected to the parallel-connected, remaining buffer units in the first driver circuit $N_1$. Clock signals which are mutually delayed by the time delay $\delta_2+\delta_3+\delta_4+\delta_1$ thus lie on the P-M outputs of the first driver circuit $N_1$.

The connecting procedure described above is also applied in respect of the clock signal on the line 16, wherein the first buffer unit $M_1$ in the driver circuit $N_3$ is connected to the input of the second buffer unit in the fourth driver circuit $N_4$, and so on, until the clock signal delayed by the time delay $\delta_3+\delta_4+\delta_1$ lies on the parallel-connected inputs of the second driver circuit $N_2$. Clock signals which are mutually delayed by the time delay $\delta_3+\delta_4+\delta_1+\delta_2$, i.e., delayed to the same extent as the output signals in the driver circuits $N_4$ and $N_1$, thus lie on remaining P-M outputs of the driver circuit $N_2$.

The connecting procedure described above is also applied in respect of the clock signal on the line 17. Thus, the clock signal delayed by the time delay $\delta_4+\delta_1+\delta_2$ is distributed to the parallel-connected inputs of the third driver circuit $N_3$ prior to being subjected to a last time delay $\delta_3$ in the driver circuit $N_3$. Thus, clock signals having a mutual delay equal to $\delta_1+\delta_2+\delta_3+\delta_4$ will now also lie on the P-M outputs of the third driver circuit $N_3$.

It will be evident from the aforegoing that the N·(P-M) output signals on the four driver circuits will all be delayed mutually by a time delay of $\delta_1+\delta_2+\delta_3+\delta_4$.

It will be obvious that the described principle can be applied to connect together any desired number N of driver circuits. By reserving N−1 buffer units in each driver circuit, the clock signal can be prepared for successive delays in each of N−2 driver circuits before being subjected to a final delay. At the Nth delay, i.e., at the last or final delay, the N−1 delayed clock signal is subjected to a delay which renders the total delay of the clock signal equal to the delay of each of the N-number of driver circuits. A similar procedure is carried out for each of the clock signals on the first buffer unit in each of the remaining N−1 driver circuits.

It is assumed in the examples illustrated in FIGS. 2 and 3 that the buffer units are numbered in an ordered sequence, such that the output of, e.g., the second buffer unit in the driver circuit is connected to the output of the third buffer unit in a next following driver circuit. It will be understood, however, that this need not necessarily be the case, since it will suffice to connect the output from said second buffer unit to the input of any buffer unit whatsoever in the next-following driver circuit. The essential feature is, of course, that the clock signal from the preceding driver circuit is subjected to delay in one of the buffer units in the following driver circuit. In other words, the order sequence between the buffer units of a driver circuit, any driver circuit whatsoever, may be reversed.

In the case of the FIG. 2 and FIG. 3 examples, the driver circuits have been numbered in an ordered sequence such that a clock signal will pass from, e.g., the driver circuit $N_2$ to the driver circuit $N_3$. It will be understood, however, that a clock signal may alternatively pass from the driver circuit $N_2$ to the driver circuit $N_4$, for instance, and to pass back from the driver circuit $N_4$ to the driver circuit $N_3$ and from the driver circuit $N_3$ to the driver circuit $N_1$.

It is important to the present invention that in an arrangement consisting of N number of driver circuits, the clock signal from the clock-signal source shall be distributed to each of the driver circuits and each of the clock signals shall thereafter be passed through each of the remaining driver circuits in a manner such that the signals will be subjected to at most one delay in each driver circuit.

As will be evident from the above description, P is an integer of any desired value. On the other hand, M is the number of driver circuits used, and the number of reserved buffer units will be given by the number of driver circuits used.

When N driver circuits each having P buffer units are connected together, the number of clock signals will thus equal $N°(P-N+1)$. The maximum number of clock signals from one construction is obtained when the number of driver circuits N is $(P+1)/2$.

It will be understood that the aforedescribed and illustrated embodiments of the invention can be modified and changed in many ways within the scope of the following claims.

I claim:

1. A method of generating a large number of clock pulses having a time difference therebetween which at maximum equals a predefined value, said method comprising the steps of:

feeding a master clock pulse from a clock pulse source in parallel to a first number of driver circuits, each driver circuit having a respective skew and each comprising a first plurality of buffer circuits, each buffer circuit having an input and an output, by feeding said master clock pulse to a free input, thus subjecting said master clock pulse to a first delay, feeding each one of said once delayed signals to a free input of a following driver circuit in order to subject said once delayed signals to a second delay, wherein said step of feeding the delay signal is repeated until a total number of delays equals said first number of driver circuits minus 1, thus generating at each of the driver circuits an intermediate delayed signal which has been delayed said total number of times, eventually feeding said intermediate delayed signals in parallel to a second number of free buffer circuits of a respective following driver circuit so as to subject said intermediate delayed signals to a final delay, thus generating at the outputs of said non-used buffer circuits a corresponding second number of clock pulses, said second number of clock pulses appearing at each one of said driver circuits together forming said large number of clock pulses having a time difference therebetween which at maximum is the sum of the skews of each one of the driver circuits and which forms said predefined value.

2. An arrangement for generating a large number of clock pulses having a time difference therebetween which at maximum equals a predefined value, comprising:

a first number of driver circuits having a respective skew and each comprising a first plurality of buffer circuits, each buffer circuit having an input and an output, a clock pulse source for generating a master clock pulse which is fed in parallel to a first buffer circuit at each one of said driver circuits so as to be subjected thereby to a first delay, at each driver circuit said output of said first buffer circuit being connected to a free second buffer circuit in another driver circuit in which the once delayed signals are subjected to a second delay, wherein at each driver circuit said output of said second buffer circuit being connected to a free third buffer circuit in another driver circuit in which said twice delayed signals are subjected to a third delay, repeatingly connecting the output of a buffer circuit to a following free buffer circuit as many times as said first number of driver circuits minus 1 to produce intermediate delayed signals, wherein each of the intermediate delayed signals, at each driver circuit, eventually is connected in parallel to a second number of free buffer circuits of a following driver circuit, wherein the output signals from said second number of buffer circuits together will form said large number of clock pulses which have a time difference therebetween which at maximum is the sum of the skews inherent in each of the driver circuits, said sum forming said predefined value.

3. An arrangement for generating a large number of clock pulses in accordance with claim 2, wherein said driver circuits are disposed rotationally-symmetrical on a circuit board, and conductors between said buffer circuits, which are used to produce said repetitive delays of the master clock pulse, are symmetrical.

* * * * *